(12) United States Patent
Lee et al.

(10) Patent No.: US 12,141,379 B1
(45) Date of Patent: Nov. 12, 2024

(54) STYLUS PEN HAVING AN AUTOMATIC CONSECUTIVE TAPPING FUNCTION

(71) Applicant: SUNREX TECHNOLOGY CORP., Taichung (TW)

(72) Inventors: Chih-Cheng Lee, Taichung (TW); Wen-Hao Kuo, Taichung (TW); Jyun-Ying Jin, New Taipei (TW)

(73) Assignee: Sunrex Technology Corp., Taichung (TW)

( * ) Notice: Subject to any disclaimer, the term of this patent is extended or adjusted under 35 U.S.C. 154(b) by 0 days.

(21) Appl. No.: 18/362,019

(22) Filed: Jul. 31, 2023

(30) Foreign Application Priority Data

Apr. 27, 2023 (TW) .................................. 112115770

(51) Int. Cl.
*G06F 3/038* (2013.01)
*G06F 3/0354* (2013.01)

(52) U.S. Cl.
CPC ........ *G06F 3/0383* (2013.01); *G06F 3/03545* (2013.01)

(58) Field of Classification Search
None
See application file for complete search history.

(56) References Cited

U.S. PATENT DOCUMENTS

| | | | | |
|---|---|---|---|---|
| 12,001,617 B1* | 6/2024 | Jung | ...................... | G06F 3/0383 |
| 2011/0090146 A1* | 4/2011 | Katsurahira | ............ | G06F 3/046 |
| | | | | 345/156 |
| 2012/0327040 A1* | 12/2012 | Simon | ................. | G06F 3/03545 |
| | | | | 345/179 |
| 2016/0282965 A1* | 9/2016 | Jensen | ................ | G06F 3/04162 |
| 2018/0024653 A1* | 1/2018 | Attarian | ................ | G06F 3/0383 |
| | | | | 345/179 |
| 2018/0232069 A1* | 8/2018 | Krishnakumar | ...... | G06F 3/0488 |
| 2020/0125208 A1* | 4/2020 | Li | .......................... | G06F 3/0416 |

\* cited by examiner

*Primary Examiner* — Benjamin C Lee
*Assistant Examiner* — Emily J Frank
(74) *Attorney, Agent, or Firm* — Burris Law, PLLC

(57) ABSTRACT

A stylus pen including a pen unit, a switch, and a control unit is provided. The pen unit includes a tip, and a shaft connected to the tip. The control unit is switchable between a default mode and an alternative mode in response to operation on the switch. In the default mode, the control unit emits a default-mode wave of a default-mode frequency to the shaft. In the alternative mode, the control unit emits an alternative-mode wave to the shaft in a pulsating pattern. The pulsating pattern has a wave period that includes a working period where the control unit emits the alternative-mode wave of the default-mode frequency, and a non-working period where the control unit stops emitting the alternative-mode wave.

11 Claims, 5 Drawing Sheets

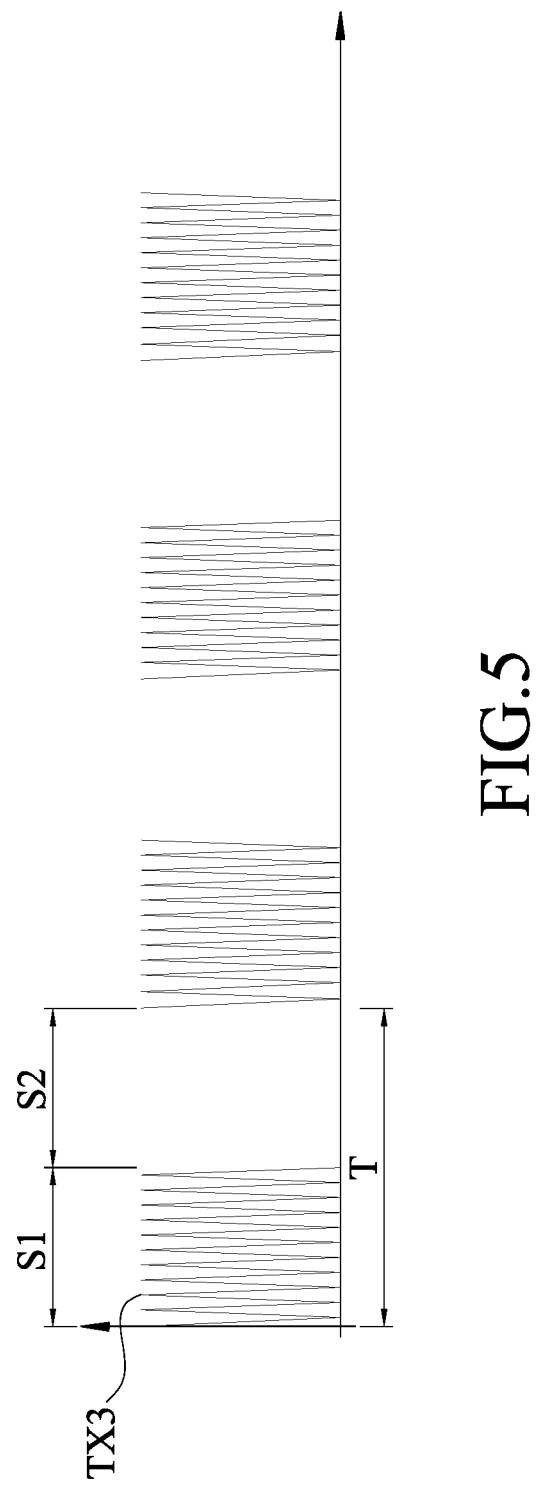

STYLUS PEN HAVING AN AUTOMATIC CONSECUTIVE TAPPING FUNCTION

CROSS-REFERENCE TO RELATED APPLICATION

This application claims priority to Taiwanese Invention Patent Application No. 112115770, filed on Apr. 27, 2023.

FIELD

The disclosure relates to a stylus pen, and more particularly to a stylus pen with an automatic consecutive tapping function.

BACKGROUND

Conventionally, people play mobile games by using a finger to tap on a touch screen of a mobile phone or a tablet, and some operations of the mobile games may require a large number of taps on the touch screen, so after playing the games for an extended period, the accumulated number of tapping may reach tens of thousands, which may cause harm to the finger.

Alternatively, people may use a stylus pen to play the mobile games; however, with prolonged use, excessive amount of tapping may cause damages to the stylus pen and/or the touch screen, thus creating additional costs for maintenance of the stylus pen and/or the touch screen.

SUMMARY

Therefore, an object of the disclosure is to provide a stylus pen that can alleviate at least one of the drawbacks of the prior art.

According to the disclosure, a stylus pen having an automatic consecutive tapping function is provided. The stylus pen includes a pen unit, an operation switch, and a control unit. The pen unit includes a tip that is electrically conductive, and a shaft that is connected to the tip and that is electrically conductive. The control unit is electrically connected to the shaft and the operation switch, and is configured to be switched between a default mode and an alternative mode in response to a specific type of operation on the operation switch. The control unit is configured to, when operating in the default mode, emit a default-mode electromagnetic wave of a default-mode frequency to the shaft. The control unit is configured to, when the control unit is operating in the alternative mode, emit an alternative-mode electromagnetic wave to the shaft in a pulsating pattern that has a wave period. The wave period includes a working period where the control unit emits the alternative-mode electromagnetic wave of the default-mode frequency, and a non-working period where the control unit stops emitting the alternative-mode electromagnetic wave.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 5 is a waveform diagram illustrating a change in a wave period of the third electromagnetic wave emitted in the alternative mode according to an embodiment of the disclosure.

DETAILED DESCRIPTION

Figure 1:
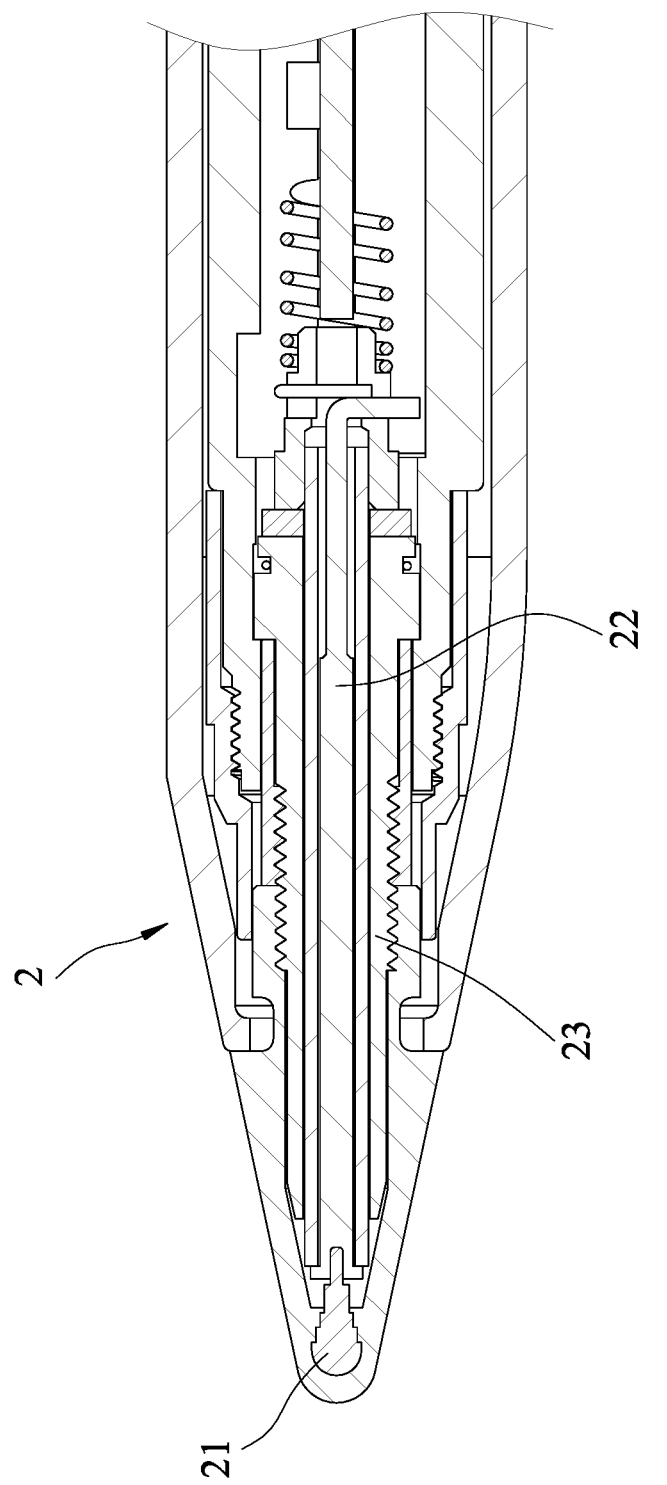
FIG. 1 is a fragmentary sectional view illustrating a part of a pen unit of a stylus pen according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
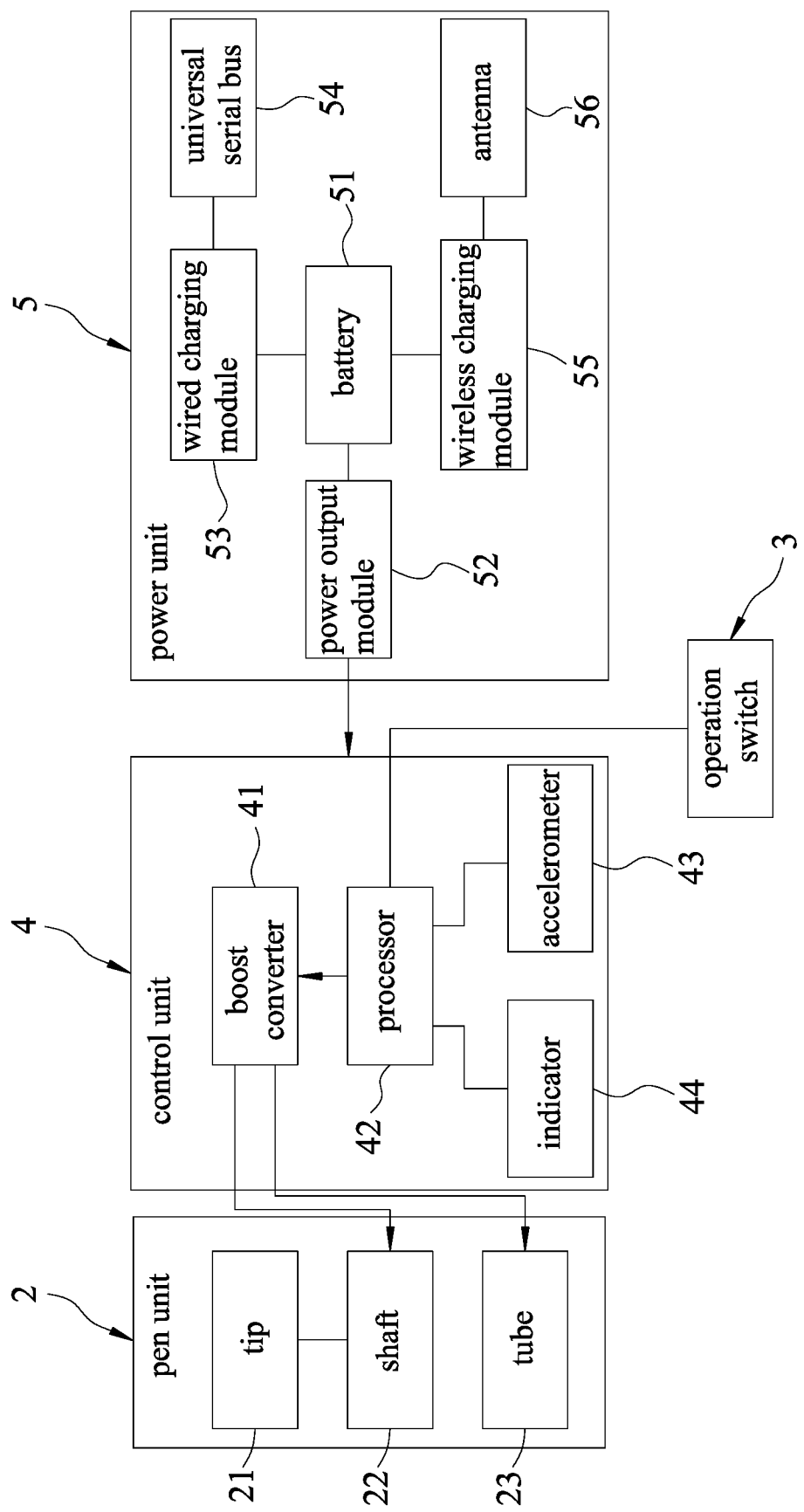
FIG. 2 is a block diagram illustrating a stylus pen according to an embodiment of the disclosure.
Figure 3:
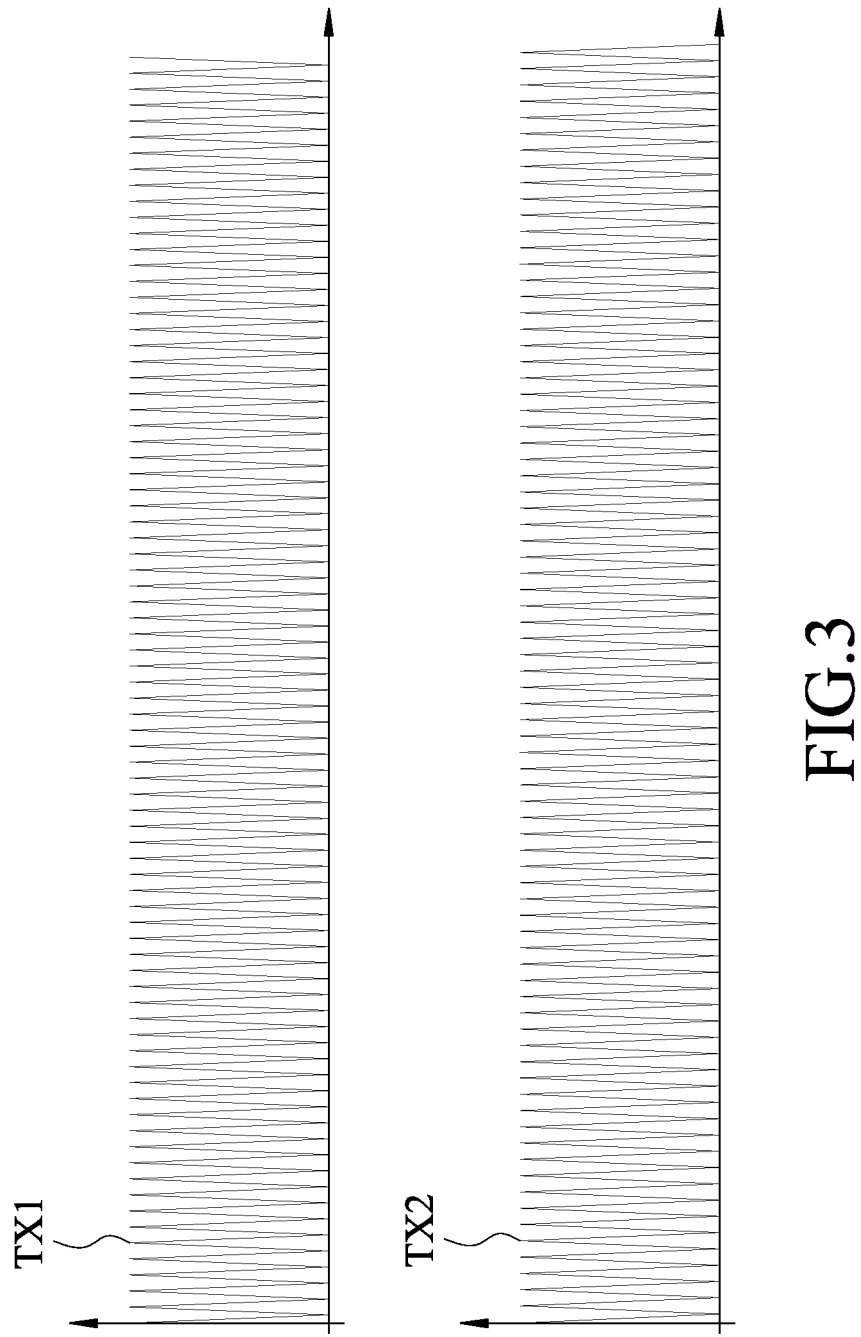
FIG. 3 is a waveform diagram illustrating a first electromagnetic wave and a second electromagnetic wave emitted in a default mode according to an embodiment of the disclosure.

Referring to FIGS. 1 to 3, a stylus pen with an automatic consecutive tapping function is provided. The stylus pen includes a pen unit 2, an operation switch 3, a control unit 4, and a power unit 5.

The pen unit 2 includes a tip 21 that is electrically conductive, a shaft 22 that is connected to the tip 21 and that is electrically conductive, and a tube 23 that surrounds the shaft 22 and that is electrically conductive. The tube 23 is spaced apart from and does not contact the shaft 22 and the tip 21. In one example, an insulating wall is disposed between the tube 23 and the shaft 22. The operation switch 3 is disposed on the pen unit 2. In this embodiment, the operation switch 3 is implemented using a momentary switch.

The control unit 4 is electrically connected to the shaft 22, the tube 23, and the operation switch 3, and includes a boost converter 41, a processor 42, an accelerometer 43, and an indicator 44. The boost converter 41 is electrically connected to the shaft 22 and the tube 23. The processor 42 is electrically connected to the boost converter 41, the accelerometer 43, the indicator 44, and the operation switch 3. The processor 42 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), and/or a system on a chip (SoC), etc. In this embodiment, the accelerometer 43 is implemented using a three-axis accelerometer, but this disclosure is not limited to such.

The power unit 5 includes a battery 51, a power output module 52, a wired charging module 53, a universal serial bus (USB) 54, a wireless charging module 55, and an antenna 56. The power output module 52 is electrically connected to the battery 51 and the control unit 4, and is configured to convert electrical power outputted by the battery 51 into electrical energy for use by the control unit 4 (e.g., from a battery voltage level to one or more voltage levels that are suitable for use by the control unit 4). The wired charging module 53 is electrically connected to the battery 51 and the universal serial bus 54, and is configured to charge up the battery 51 when the universal serial bus 54 is connected to an external power source (e.g., the mains electricity). The wireless charging module 55 is electrically connected to the battery 51 and the antenna 56, and is configured to charge up the battery 51 when a magnetic field is generated in view of magnetic coupling between the antenna 56 and an external power source (e.g., a portable power bank). It should be noted that a wired charging technology using the USB 54 and a wireless charging technology using the antenna 56 are well-known to one having ordinary skill in the art, and will not be described in further detail for the sake of brevity.

Figure 4:
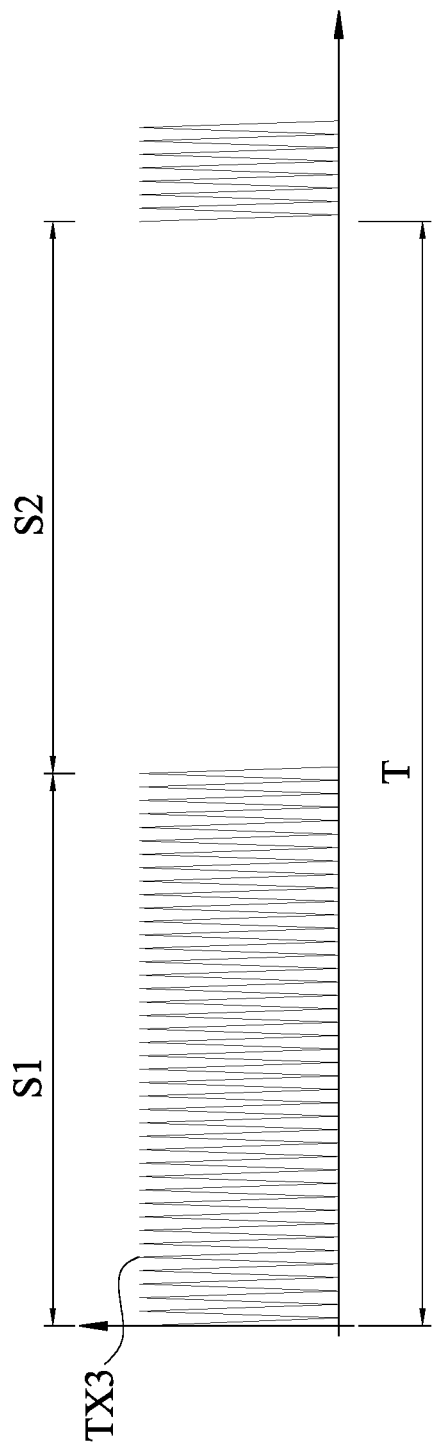
FIG. 4 is a waveform diagram illustrating a third electromagnetic wave emitted in an alternative mode according to an embodiment of the disclosure.

Further referring to FIG. 4, the control unit 4 is configured to be switched between a default mode and an alternative mode in response to a first type of operation (e.g., a long press) on the operation switch 3. In this embodiment, the control unit 4 is configured to operate in the default mode when turned on, to be switched from the default mode to the alternative mode when the operation switch 3 is long pressed (e.g., being pressed for a first predetermined time period), and to be switched from the alternative mode back to the default mode when the operation switch 3 is long-pressed again.

Referring to FIGS. 2 and 3, the control unit 4 is configured to, when operating in the default mode, emit a first electromagnetic wave (TX1) to the shaft 22, and emit a second electromagnetic wave (TX2) to the tube 23. The first electromagnetic wave (TX1) has a first frequency, the second electromagnetic wave (TX2) has a second frequency which is different from the first frequency, and both of the first electromagnetic wave (TX1) and the second electromagnetic wave (TX2) are constantly being emitted when the control unit 4 is operating in the default mode. The processor 42 is configured to, when the control unit 4 is operating in the default mode, output a first signal and a second signal to the boost converter 41, and the boost converter 41 is configured to, upon receiving the first signal and the second signal, step up voltages of the first signal and the second signal, emit the first signal thus stepped up as the first electromagnetic wave (TX1), and emit the second signal thus stepped up as the second electromagnetic wave (TX2). In this embodiment, the first electromagnetic wave (TX1) is a triangular wave with a first amplitude of between 12 V and 15 V, and the first frequency is 485 kHz; the second electromagnetic wave (TX2) is another triangular wave with a second amplitude of between 12 V and 15 V, and the second frequency is 471 kHz.

Further referring to FIG. 4, the control unit 4 is configured to, when operating in the alternative mode, emit a third electromagnetic wave (TX3) to the shaft 22 in a pulsating pattern that has a wave period (T). The wave period (T) includes a working period (S1) where the control unit 4 emits the third electromagnetic wave (TX3) of the first frequency, and a non-working period (S2) where the control unit 4 stops emitting the third electromagnetic wave (TX3). That is to say, the third electromagnetic wave (TX3) has the first frequency, and is emitted at predetermined intervals (i.e., the control unit 4 alternating between emitting and not emitting the third electromagnetic wave (TX3)) when the control unit 4 is operating in the alternative mode. The processor 42 is configured to, when the control unit 4 is operating in the alternative mode, output a third signal to the boost converter 41 during the working period (S1), and the boost converter 41 is configured to, upon receiving the third signal, step up voltage of the third signal and emit the third signal thus stepped up as the third electromagnetic wave (TX3). In this embodiment, the third electromagnetic wave (TX3) is a triangular wave with a third amplitude of between 12 V and 15 V.

It should be noted that the control unit 4 is configured to, when operating in the alternative mode, not emit the second electromagnetic wave (TX2) to the tube 23 so as to conserve electrical energy.

Further referring to FIG. 5, the control unit 4 is further configured to, when operating in the alternative mode, change the wave period (T) of the pulsating pattern in response to a second type of operation (e.g., a short press) on the operation switch 3. For example, when operating in the alternative mode, the control unit 4 operates (i.e., emits the third electromagnetic wave (TX3)) according to the wave period (T), the working period (S1), and the non-working period (S2); every time the operation switch 3 is pressed for shorter than the first predetermined time period, the wave period (T), the working period (S1), and the non-working period (S2) are reduced by a predetermined percentage (e.g., 50%) until a predetermined lower limit of the wave period (T) is reached. The wave period (T), the working period (S1), and the non-working period (S2) may return to respective default time lengths when the operation switch 3 is held at being pressed for the first predetermined time period (i.e., long-pressed) in order to switch the control unit 4 to the default mode.

In this embodiment, the processor 42 is configured to enter a sleep state when determining that the accelerometer 43 has not detected acceleration for a second predetermined time period, and leave the sleep state (i.e., resume a normal state) upon the accelerometer 43 detecting acceleration. For example, the processor 42 may leave the sleep state when receiving a signal from the accelerometer 43 indicating detection of acceleration. In one embodiment, when the processor 42 enters the sleep state, the processor 42 controls the power unit to temporarily stop providing the electrical energy to the various components in the control unit 4 other than the processor 42 and the accelerometer 43, and when the processor 42 leaves the sleep state, the processor 42 controls the power unit 5 to resume provision of the electrical energy to all components in the control unit 4. In this embodiment, the processor 42 controls the power unit 5 to temporarily stop providing the electrical energy to the boost converter 41 in the sleep state, and the power consumption of the processor 42 in the sleep state is reduced compared to when the processor 42 is operating normally.

The processor 42 is further configured to control the indicator 44 to display in one of a plurality of manners based on a current state of the stylus pen. For example, the current state of the stylus pen may indicate that the stylus pen is in use (e.g., default mode or alternative mode), that the stylus pen is in the sleep state, or the charging status of the stylus pen (e.g., charging or fully charged), etc. The indicator 44 may include a plurality of light-emitting diodes (LEDs) (not shown) respectively having different colors, and the indicator 44 may be controlled by the processor 42 to emit light in one of the different colors depending on the current state of the stylus pen.

When a user is using the stylus pen according to the disclosure on a touch screen (not shown), and when the control unit 4 is operating in the default mode, the first electromagnetic wave (TX1) is transmitted to the tip 21 through the shaft 22 and is emitted by the tip 21, which may allow the touch screen to determine whether the touch screen has been contacted by the tip 21 of the stylus pen, and the second electromagnetic wave (TX2) is emitted by the tube 23, which may allow the touch screen to determine a relative position between a source of the second electromagnetic wave (TX2) (i.e., the tube 23) and a source of the first electromagnetic wave (TX1) (i.e., the tip 21), thus enabling the touch screen to determine a tilt of the stylus pen, which may be useful in drawing applications.

When the user requires consecutive tapping on the touch screen (e.g., when playing a mobile game), the user may switch the control unit 4 to the alternative mode, and the third electromagnetic wave (TX3) is transmitted to the tip 21 through the shaft 22 and is emitted by the tip 21. Since the third electromagnetic wave (TX3) is emitted periodically in the pulsating pattern (i.e., emitted during the working period (S1) and not emitted during the non-working period (S2)), which simulates a state of the stylus pen consecutively tapping on the touch screen (i.e., the working period (S1) simulates the stylus pen contacting the touch screen, and the non-working period (S2) simulates the stylus pen not contacting the touch screen), the touch screen that receives the periodically-emitted third electromagnetic wave (TX3) would act as if being consecutively tapped by the stylus pen that operates in the default mode. That is to say, the stylus pen that is operating in the alternative mode may be held stationarily while contacting the touch screen, and the touch screen would consider the stylus pen as if the stylus pen was consecutively tapping on the touch screen.

In summary, when the control unit 4 is operating in the alternative mode, the control unit 4 emits the third electromagnetic wave (TX3) in the pulsating pattern to simulate the state of the stylus pen consecutively tapping on the touch screen, which may reduce wear on both the stylus pen and the touch screen that would otherwise have been caused by consecutive physical taps of the stylus pen on the touch screen.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A stylus pen having an automatic consecutive tapping function, comprising:

a pen unit including a tip that is electrically conductive, and a shaft that is connected to said tip and that is electrically conductive;

an operation switch; and a control unit electrically connected to said shaft and said operation switch, said control unit being configured to be switched between a default mode and an alternative mode in response to a first type of operation on said operation switch, wherein said control unit is configured to, when operating in the default mode, emit a default-mode electromagnetic wave of a default-mode frequency to said shaft in a continuous manner for a touch screen to determine whether the touch screen has been contacted by a tip of the stylus pen, and said control unit is configured to, when said control unit is operating in the alternative mode, emit an alternative-mode electromagnetic wave to said shaft in a pulsating pattern that has a wave period, for providing the automatic consecutive tapping function for when a user requires consecutive tapping on the touch screen, the wave period including a working period where said control unit emits the alternative-mode electromagnetic wave of the default-mode frequency, and a non-working period where said control unit stops emitting the alternative-mode electromagnetic wave.

2. The stylus pen as claimed in claim 1, wherein:

said pen unit further includes a tube that surrounds said shaft and that is electrically conductive;

said control unit is further electrically connected to said tube and is configured to, when operating in the default mode, emit an additional electromagnetic wave of another frequency that is different from the default-mode frequency to said tube.

3. The stylus pen as claimed in claim 2, wherein:

said control unit further includes a boost converter that is electrically connected to said shaft and said tube, and a processor that is electrically connected to said boost converter and said operation switch;

said processor is configured to, when said control unit is operating in the default mode, output a default-mode signal and an additional signal to said boost converter, and said boost converter is configured to, upon receiving the default-mode signal and the additional signal, step up voltages of the default-mode signal and the additional signal, emit the default-mode signal thus stepped up as the default-mode electromagnetic wave, and emit the additional signal thus stepped up as the additional electromagnetic wave; and said processor is configured to, when said control unit is operating in the alternative mode, output an alternative-mode signal to said boost converter during the working period, and said boost converter is configured to, upon receiving the alternative-mode signal, step up voltage of the alternative-mode signal and emit the alternative-mode signal thus stepped up as the alternative-mode electromagnetic wave.

4. The stylus pen as claimed in claim 1, wherein:

said control unit further includes a boost converter that is electrically connected to said shaft, and a processor that is electrically connected to said boost converter and said operation switch;

said processor is configured to, when said control unit is operating in the default mode, output a default-mode signal to said boost converter, and said boost converter is configured to, upon receiving the default-mode signal, step up voltage of the default-mode signal and emit the default-mode signal thus stepped up as the default-mode electromagnetic wave; and said processor is configured to, when said control unit is operating in the alternative mode, output an alternative-mode signal to said boost converter during the working period, and said boost converter is configured to, upon receiving the alternative-mode signal, step up voltage of the alternative-mode signal and emit the alternative-mode signal thus stepped up as the alternative-mode electromagnetic wave.

5. The stylus pen as claimed in claim 4, wherein said control unit further includes an accelerometer that is electrically connected to said processor, said processor is configured to enter a sleep state when determining that said accelerometer has not detected acceleration for a predetermined time period, and leave the sleep state upon said accelerometer detecting acceleration.

6. The stylus pen as claimed in claim 5, wherein said control unit further includes an indicator that is electrically connected to said processor, and said processor is configured to control said indicator to display in one of a plurality of manners based on a current state of said stylus pen.

7. The stylus pen as claimed in claim 1, further comprising a power unit, said power unit including a battery and a power output module that is electrically connected to said battery and said control unit, wherein said power output module is configured to convert electrical power outputted by said battery into electrical energy for use by said control unit.

8. The stylus pen as claimed in claim 7, wherein said power unit further includes a wired charging module that is electrically connected to said battery and that is configured to charge up said battery.

9. The stylus pen as claimed in claim 8, wherein said power unit further includes a universal serial bus that is electrically connected to said wired charging module.

10. The stylus pen as claimed in claim 7, wherein said power unit further includes a wireless charging module that is electrically connected to said battery and that is configured to charge up said battery, and an antenna that is electrically connected to said wireless charging module.

11. The stylus pen as claimed in claim 1, wherein said control unit is further configured to, when said control unit is operating in the alternative mode, change the wave period of the pulsating pattern in response to a second type of operation on said operation switch.

* * * * *